May 23, 1933.  H. W. MILLS  1,910,032
DISPENSING DEVICE
Filed July 16, 1932
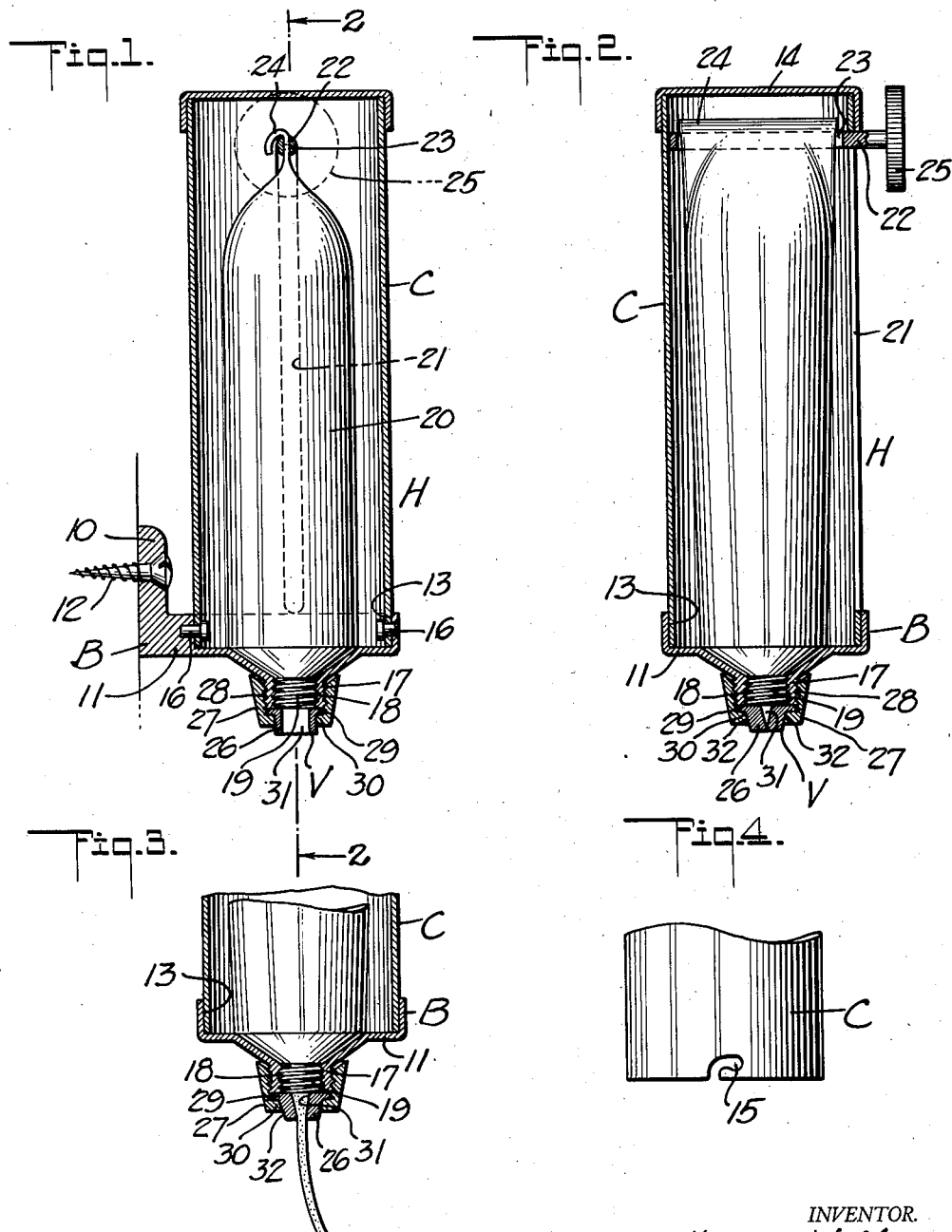
INVENTOR.
HAROLD W. MILLS
BY
ATTORNEYS.

Patented May 23, 1933

1,910,032

UNITED STATES PATENT OFFICE

HAROLD W. MILLS, OF GLENDALE, CALIFORNIA

DISPENSING DEVICE

Application filed July 16, 1932. Serial No. 622,945.

This invention relates to and has for a purpose the provision of a device by which a collapsible tube or container for dental cream, shaving cream or other substance can be supported and the contents dispensed with the utmost ease and dispatch and in an entirely sanitary as well as economical manner.

It is another purpose of the invention to provide a device of the above described character which embodies a valve of elastic or yieldable material which, in its association with the outlet of a collapsible container supported by the device, functions to normally close or seal the outlet, yet yields so as to open automatically when pressure is applied upon the contents of the container by collapsing the latter, whereby to dispense the contents until the internal pressure is relieved, upon which the valve closes automatically to again seal the outlet.

It is a further purpose of the invention to provide means by which the elastic valve can be adjusted to vary the extent to which it opens under the action of internal pressure placed upon the contents of the container, to the end of varying the amount of the contents of the container which are dispensed.

Only one form of the invention will now be described, following which its novel features will be pointed out in claims.

In the accompanying drawing

Figure 1 is a view showing in longitudinal section one form of dispensing device and a conventional form of collapsible tube associated therewith;

Figure 2 is a sectional view taken on the line 2—2 of Figure 1, and showing the valve in closed position;

Figure 3 is a fragmentary sectional view similar to Figure 2, but showing the valve open;

Figure 4 is a fragmentary view in elevation of a portion of the casing embodied in the device.

Referring specifically to the drawing, wherein similar reference characters designate similar parts in each of the several views, this invention comprises a holder H including a bracket B and a casing C, detachably associated therewith. The bracket B is of L-shape to provide right angularly related portions 10 and 11, the former of which is adapted to be secured to a wall or other support by a fastening member 12. The portion 11 is provided with a circular socket 13 which snugly receives the open end of the casing C, the opposite end of the casing being permanently closed by a cap 14. The casing is in the form of a cylinder, and adjacent its open end it is provided with bayonet slots 15 which are adapted to coact with headed pins 16 projecting into the socket 13, to detachably secure the casing to the bracket, as will be understood.

The bracket B is provided with an outlet in the form of a collar 17 internally threaded at 18 to threadedly receive the usual externally threaded neck 19 on the delivery end of a conventional collapsible tube 20 containing dental cream, shaving cream or other fluid substance. The tube thus will be rigidly supported by the bracket; and it will be understood that following the screwing of the tube neck 19 into the collar 17, the casing is applied to the bracket. The casing is provided with a longitudinal slot 21 through which is extended a shaft 22 having a diametric slot 23 receiving the closed and flattened end 24 of the tube 20. The shaft is provided with a knob 25 by which it can be rotated to wind the tube on the shaft as the latter feeds in the slot, with the result that the contents of the tube will be placed under pressure so as to discharge from the neck 19 of the tube under the control of a valve designated generally at V.

The valve V comprises a body 26 of resilient or yieldable material such as elastic rubber and is secured to the bracket B against the outer end of the collar 17 by a nut 27 threaded onto the externally threaded portion 28 of the collar; the body 26 extending through the nut and being provided with an outwardly extending flange 29 seating against an inwardly projecting flange 30 on the nut so that the flange 29 of the body is clamped by the nut between the flange 30 of the latter and the outer end of the collar 17, as clearly shown in the drawing.

The body 26 is provided with a port 31 normally of wedge shape in a direction axially of the body and the collapsible tube, with the inner end of the port open and confronting the discharge opening of the neck 19, and the outer end of the port closed as shown in Figure 2 so as to seal the contents of the tube.

The operation of the device is as follows:

It is to be understood that the elasticity of the material from which the body 26 is constructed, normally maintains the port 31 closed so that the contents of the tube 20 will be hermetically sealed against contamination or deterioration. However, when it is desired to dispense some of the contents of the tube therefrom, rotation of the shaft 22 by the knob 25 in a direction to wind the tube on the shaft, will place the contents of the tube under pressure, which is transmitted to the inner open end of the port, thus causing the port to expand as shown in Figure 3, so that its normally closed outer end opens to thereby dispense the substance from the tube in the form of a flat ribbon, as clearly shown in this figure.

When the pressure upon the contents of the tube is relieved by discontinuing turning movement of the shaft, the elasticity of the body 26 will cause the port to automatically contract until it is again closed as shown in Figure 2, thus severing the dispensed portion of the contents from the valve and effectively sealing the contents of the tube. It will be clear that when the port is in closed position its inner end will remain open so as to enable the substance stored in the tube to readily enter and expand the port to its open position when pressure is applied upon the tube.

It will be noted that opposite sides of the body 26 are oppositely inclined as indicated at 32—32 so as to coact with the flange 30 of the nut 27, in compressing the body 26 as the nut is screwed further onto the collar 17, with the result of more tightly closing the port. It will thus be necessary for a greater pressure to be exerted against the contents of the tube in order to open the port, to the end that a less quantity of the substance will be dispensed in a form of a thinner ribbon, due to the fact that the port will open to a less extent under the action of the internal pressure. The valve can thus be readily regulated in response to adjustment of the nut 27, so as to dispense the substance in greater or less volume.

I claim:

1. A dispensing device comprising a holder having an internally threaded portion into which the externally threaded neck of a collapsible tube is adapted to be screwed to support the tube on the holder; a ported body of elastic material; and means for supporting said body on the holder with the port of the body normally closed to hermetically seal the tube outlet, while rendering the body free to yield and the port to open under pressure imposed on the contents of the tube, so as to dispense the contents through the port.

2. A dispensing device comprising a holder having an internally threaded collar into which the neck of a collapsible tube is adapted to be screwed to support the tube on the holder; a valve for controlling the outlet of the tube comprising a body of elastic material having a normally closed port; and means for supporting the body on the holder with the port disposed to be opened by the contents of the tube when pressure is imposed on the contents, whereby to dispense the contents through said port.

3. A dispensing device comprising a holder having an internally threaded collar into which the neck of a collapsible tube is adapted to be screwed to support the tube on the holder; a valve for controlling the outlet of the tube comprising a body of elastic material having a normally closed port; adjustable means for supporting the body on the holder with the port disposed to be opened by the contents of the tube when pressure is imposed thereon; and means responsive to adjustment of the last named means to compress the body and more tightly close the port for the purpose described.

4. A dispensing device comprising a holder having an internally threaded collar into which the neck of a collapsible tube is adapted to be screwed to support the tube on the holder; a valve for controlling the outlet of the tube comprising a body of elastic material having a normally closed port; and a nut threaded on the collar and coacting with the body to support the latter with its port disposed to be opened by the contents of the tube when pressure is imposed thereon.

5. A dispensing device comprising a holder having an internally threaded collar into which the neck of a collapsible tube is adapted to be secured to support the tube on the holder; a valve for controlling the outlet of the tube comprising a body of elastic material having a normally closed port; a nut threaded on the collar and coacting with the body to support the latter with its port disposed to be opened by the contents of the tube when pressure is imposed thereon, and inclined surfaces on the body with which the nut coacts to compress the body and more tightly close the port in response to screwing movement of the nut on the collar.

6. A dispensing device comprising a holder having an internally threaded collar into which the neck of a collapsible tube is adapted to be screwed to support the tube on the holder; a valve for controlling the outlet of the tube comprising a body of elastic material having a normally closed port; the body having an outwardly projecting flange; and a nut threaded on the collar and receiving the body; the nut having an inwardly projecting flange coacting with the flange of the body to clamp the latter to the collar with the port of the body disposed to be opened by the contents of the tube when pressure is imposed thereon.

HAROLD W. MILLS.